United States Patent
Stewart (10) Patent No.: US 9,435,368 B2
(45) Date of Patent: Sep. 6, 2016

(54) INDICATING WASHER

(71) Applicants: Robert E. Stewart, Farmington Hills, MI (US); Nicholas Strumbos, Birmingham, MI (US)

(72) Inventor: Robert E. Stewart, Farmington Hills, MI (US)

(73) Assignees: Robert E. Stewart, Farmington Hills, MI (US); Nicholas Strumbos, Birmingham, MI (US)

( * ) Notice: Subject to any disclaimer, the term of this patent is extended or adjusted under 35 U.S.C. 154(b) by 189 days.

(21) Appl. No.: 14/159,100

(22) Filed: Jan. 20, 2014

(65) Prior Publication Data
US 2015/0204368 A1 Jul. 23, 2015

(51) Int. Cl.
*F16B 31/02* (2006.01)
*F16B 43/00* (2006.01)

(52) U.S. Cl.
CPC ............ *F16B 31/028* (2013.01); *F16B 43/00* (2013.01)

(58) Field of Classification Search
CPC ............................... F16B 31/028; F16B 43/00
USPC .......................................................... 411/10
See application file for complete search history.

(56) References Cited

U.S. PATENT DOCUMENTS

| | | | | |
|---|---|---|---|---|
| 1,031,970 | A * | 7/1912 | Stockford | F16B 39/24 411/162 |
| 1,043,721 | A * | 11/1912 | Prince | F16B 39/24 411/147 |
| 2,179,575 | A * | 11/1939 | Hosking | F16B 39/24 411/162 |
| 3,187,621 | A | 6/1965 | Turner | |
| 4,103,725 | A * | 8/1978 | Abe | F16B 39/24 411/160 |
| 4,302,136 | A * | 11/1981 | Abe | F16B 39/24 411/156 |
| 5,015,132 | A | 5/1991 | Turner et al. | |
| 5,370,483 | A | 12/1994 | Hood et al. | |
| 5,487,632 | A | 1/1996 | Hood et al. | |
| 5,618,145 | A * | 4/1997 | Kuo | F16B 21/186 411/368 |
| 5,667,346 | A | 9/1997 | Sharp | |
| 7,635,243 | B2 | 12/2009 | Turner et al. | |
| 8,197,167 | B2 | 6/2012 | Turner et al. | |
| 2003/0105465 | A1* | 6/2003 | Schmieding | A61B 17/0401 606/916 |
| 2008/0038076 | A1* | 2/2008 | Turner | F16B 31/028 411/10 |

* cited by examiner

*Primary Examiner* — Gary Estremsky
(74) *Attorney, Agent, or Firm* — Fishman Stewart PLLC (57) ABSTRACT

Indicating washers may include bumps and underlying dimples configured to control compression of the indicating washer during installation. Each bump may include a tapered triangular shape and may be asymmetrical with respect to each underlying dimple. Methods of operating an indicating washer system may include providing progressive compression along trailing, top, and leading ramp surfaces. Methods of manufacturing may include forming a washer from a metal sheet with a tool having an inner cutting edge, an outer cutting edge, a triangular punch, and a stop.

20 Claims, 6 Drawing Sheets

INDICATING WASHER

FIELD OF TECHNOLOGY

Fasteners and washers for use with fasteners, and more particularly, improved direct tension indicating washers that deform in a controlled manner under a compression load and indicate when a desired tension of a fastener has been achieved relative to a joint.

BACKGROUND

Indicating washers typically have protrusions to indicate when a desired tension has been achieved relative to a structural fastener assembly. Indicating washers may include arch-shaped protrusions with a uniform width along their length and a rectangular or semi-circular shape that is symmetrical about an axis perpendicular to a rotational axis of the indicating washer. As the traditional indicating washer is compressed by the fastener bearing surface during installation, the arch-shaped bumps flatten thereby increasing the contact area of the indicating washer relative to the fastener bearing surface. Due to the shape of traditional bumps, flattening increases the contact area and consequently friction of the bumps relative to the fastener bearing surface. Increased friction may result in variations in fastener rotation thereby leading to under or over tensioning and potentially failure of the fastener. It would be desirable to improve indicating washers to control friction and compression forces to facilitate accurate and consistent fastening.

Providing an improved indicating washer system for enhanced control of fastener tensioning would be helpful. Such a system may prolong the useful life of the fastener and reduce unnecessary stress on the joint. It would be desirable to employ an improved indicating washer to limit friction and compression loads, for example, between the indicating washer and fastener. It also would be desirable to provide an improved indicating washer for more accurate and stable tensioning of joints.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

Direct tension indicating washers are designed to deform in a controlled manner under a compression load and are used to indicate when a desired tension has been achieved relative to a fastener. The fastener may include any of a bolt, screw, nut, and standard washer, for example a flat, wave, spring, locking, vibration dampening, or hardened washer. The fastener may include a fastener bearing surface that may be hardened, for example, to apply compression to the indicating washer. Indicating washers may include bumps that may be radially positioned about a washer rotational axis and configured to contact the fastener bearing surface. The bumps may include a triangular shape that increases or decreases in width and height along its length. Also, the triangular shape may be asymmetrical about a washer radial axis that is perpendicular to the washer rotational axis. In addition, the bump may have one or more ramp surfaces that may taper in height. The opposing side of the indicating washer may include a dimple underlying each bump, which may have a different or asymmetrical shape with respect to the dimple. During installation, the fastener bearing surface applies a compression force against the indicating washer thereby urging the indicating washer from an initial configuration to a compressed configuration.

Embodiments of the indicating washer may have a first surface with bumps protruding therefrom, an outer surface with semi-circular segments interposed by recesses, a bore, and a second surface opposing the first surface. The outer surface and bore of the indicating washer may be defined between the first and second surfaces of the indicating washer. Each bump may have a triangular shape, tapered side surfaces, and a top surface tapering from a trailing end to a leading end toward the first surface. Alternatively, the top surface of each bump may taper in the opposite direction or have multiple tapered surfaces.

Further embodiments may include an indicating washer system including an indicating washer and a fastener such as a nut. The nut may have a first surface, an outer surface with a hexagon perimeter, a bore with threads, and a second surface opposing the first surface. The outer surface and bore of the nut may be defined between the first and second surfaces of the nut. The nut and indicating washer may be positioned individually or as a connected assembly. The second surface of the nut may have a flange extending therefrom to constrain the washer in the axial direction while allowing rotation of the indicating washer. The fastener bearing surface may be provided by the nut or a standard washer between the nut and the indicating washer.

Additional embodiments may include an indicating washer system including an indicating washer and a fastener such as a bolt or screw. For the purposes of this application, bolt and screw may be used interchangeably. The bolt may have a bolt head with a first surface, an outer surface with a hexagon perimeter, and a second surface opposing the first surface. The outer surface may be defined between the first and second surfaces of the bolt head. A shaft with threads may extend from the second surface of the bolt head. Although a hexagon perimeter may be provided as an exemplary fastener head type, it is contemplated that the fasteners herein may be of any head type, for example, slotted, square, socket, hexagon socket, Phillips, Torx, Allen, or any combination thereof.

Figure 1:
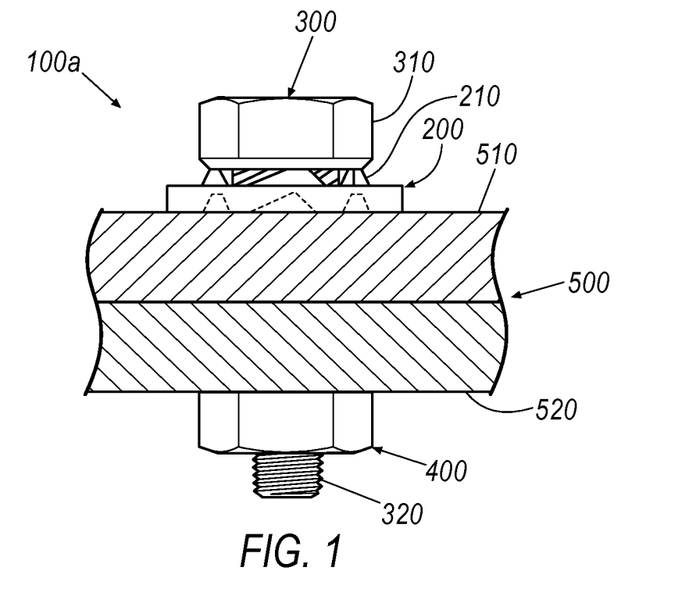
FIG. 1 illustrates an exemplary side view of an indicating washer system of the present disclosure.
Figure 2:
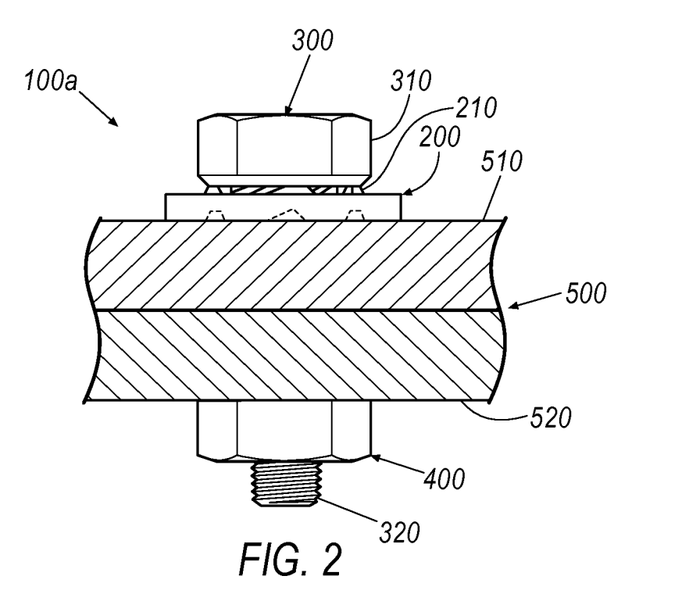
FIG. 2 illustrates another view of the system of FIG. 1, more particularly, in a compressed configuration.

FIG. 1 illustrates an exemplary embodiment of system 100a. System 100a may include washer 200, bolt 300, and nut 400 and may be positioned with respect to joint 500. In system 100a, washer 200 and bolt 300 may be positioned on first side 510 of joint 500 and nut 400 may be positioned on second side 520 of joint 500. Joint 500 may include any number of members, for example one, two (shown), three, or more. Washer 200 may include an indicating washer. Washer 200 may include a bore and any number of bumps 210. Bolt 300 may be positioned through washer 200 and joint 500 and threaded into nut 400. Bolt 300 or nut 400 may be rotationally tensioned while the other of bolt 300 or nut 400 is rotationally constrained. Bolt 300 may include bolt head 310 and shaft 320, which may include threads along all or any portion of its length. Nut 400 may include a bore with threads. Bolt head 310 and nut 400 may include a hexagon perimeter. As system 100a is tensioned against joint 500, bolt head 310 may compress bumps 210 thereby compressing washer 200 as shown in FIG. 2.

Figure 3:
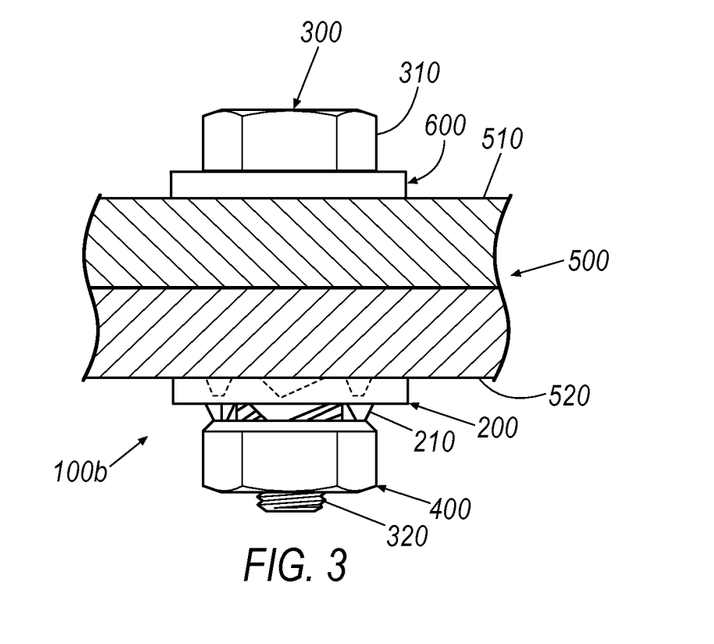
FIG. 3 illustrates an exemplary side view of an alternative embodiment of the indicating washer system, more particularly, with the indicating washer positioned on the opposing side of the joint.
Figure 4:
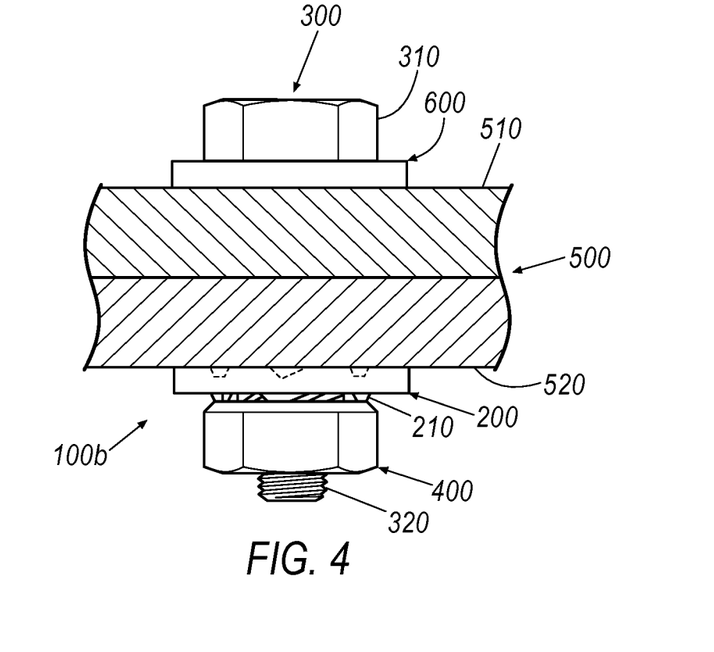
FIG. 4 illustrates another view of the system of FIG. 3, more particularly, in a compressed configuration.

As an alternative embodiment to system 100a, FIG. 3 illustrates system 100b. System 100b may include washer 200, bolt 300, nut 400, and one or more washers 600. Washer 600 may include a standard washer, for example, to reduce galling. In system 100b, washer 200 may be positioned at second side 520 of joint 500 and washer 600 may be positioned on first side 510. Alternatively, washer 600 may be positioned on second side 520 or relative to any components of system 100b, for example between washer 200 and nut 400. Bolt 300 may be positioned through washer 600, joint 500, and washer 200 and threaded into nut 400. Bolt 300 or nut 400 may be rotationally tensioned while the other of bolt 300 or nut 400 is rotationally constrained. As system 100b is rotationally tensioned against joint 500, nut 400 may compress bumps 210 thereby compressing washer 200 as shown in FIG. 4.

Washer 200 and nut 400 may be independently positioned or connected as an assembly. Nut 400 may include a flange (not shown) extending into the bore of washer 200. In assembly, the flange may be positioned through at least a portion of the bore of washer 200, then a portion of the flange may be punched or bent back against washer 200. The flange may axially constrain washer 200 while allowing rotation and compression relative to nut 400.

Figure 5:
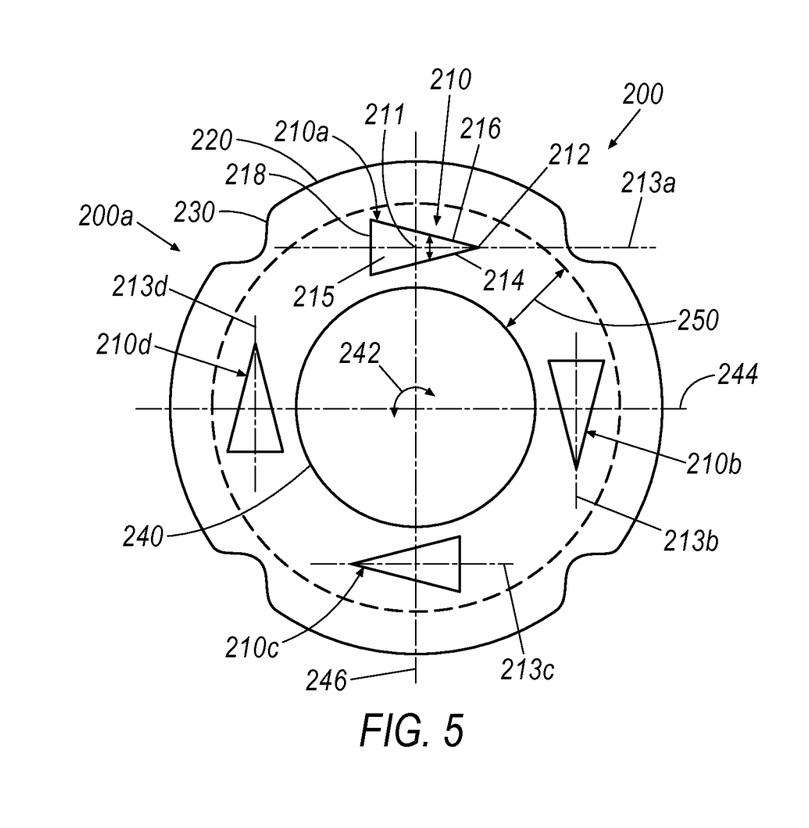
FIG. 5 illustrates an exemplary top view of an indicating washer, more particularly, including bumps having triangular shapes.

FIG. 5 illustrates an exemplary embodiment of washer 200a. Washer 200a may include any number of bumps 210 (a set is shown as 210a-210d), for example one, two, three, four (shown), five, six, seven, or more. Bumps 210 may each have a triangular shape. Washer 200a may include outer surface 220, which may be substantially circular having semi-circular segments interposed by recesses 230. Outer surface 220 may include any number of recesses 230, for example one, two, three, four (shown), five or more. Washer 200 may include washer bearing surface 250 that may be configured to substantially underlie the fastener bearing surface upon installation. In addition, any surface or edge of washer 200 may be straight, pointed, ramped, tapered, curved, rounded, chamfered, or any combination thereof. All or any portion of washer 200, for example bump 210, may be heat treated.

Bumps 210 may be configured to deform in a controlled manner under compression load and are used to indicate when a desired tension has been achieved relative to a fastener. Each bump 210 may be positioned any distance from washer rotational axis 242, for example partially or entirely within or outside washer bearing surface 250. Washer 200 may include bore 240 that may be configured to receive shaft 320 of bolt 300. Washer 200 may be configured to rotate in a particular direction relative to the fastener bearing surface, for example clockwise or counter-clockwise about washer rotational axis 242. Although the triangular shape may be provided as an exemplary shape for bump 210, it is contemplated that bump 210 may include any shape, for example any polygon shape with three, four, five, six, or more sides.

In an embodiment, bumps 210 may include top surface 215 with a triangular shape defined by substantially straight edges. Top surface 215 may be defined by leading end 212, side edges 214 and 216, and trailing end 218. Trailing end 218 may include a substantially straight or curved edge. Top surface 215 may be parallel to or at any angle with respect to first surface 260. Top surface 215 may include one, two, or more tapered surfaces at various angles with respect to first surface 260. Side edges 214 and 216 may be substantially straight and converge to a point or edge at leading end 212. Side edges 214 and 216 may converge at leading end 212 to form bump angle 211. Exemplary angles may be approximately at or between any of the following: 1, 5, 10, 15, 20, 25, 30, 35, 40, 45, 60, 75, and 90 degrees.

Bumps 210 may be radially positioned about washer rotational axis 242. As an example, bumps 210a-d may be radially positioned about washer rotational axis 242 in approximately 90 degree increments as shown. Bump axes 213a-d may be substantially perpendicular or at any angle with respect to washer rotational axis 242. Bump 210a and 210c may each have a shape that is asymmetrical about washer radial axis 246, which may be substantially perpendicular to washer rotational axis 242. Bump 210b and 210d may each have a shape that is asymmetrical about washer radial axis 244, which may be substantially perpendicular to washer rotational axis 242. Washer radial axis 244 and 246 may be angularly offset by any angle, for example, based on the number of or desired spacing between bumps 210. Alternative embodiments may include any number or shape of bumps positioned at equal or varying angular increments, distances, or orientations with respect to washer rotational axis 242. In a compressed configuration, any or all of bumps 210 may be above or below or substantially flattened with respect to first surface 260.

Figure 6:
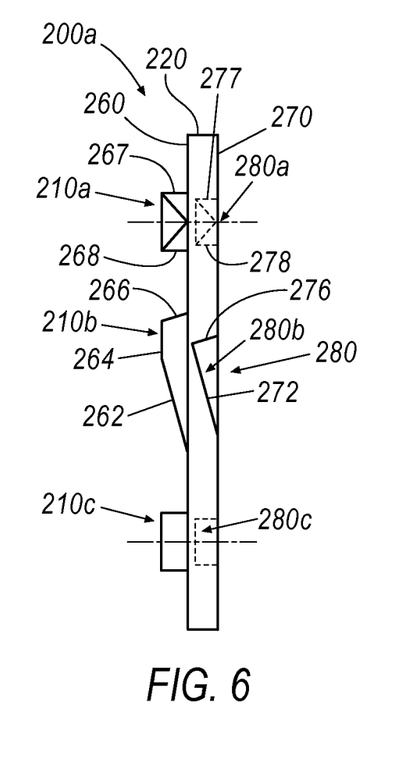
FIG. 6 illustrates a side view of the washer of FIG. 5.

Referring to FIG. 6, bumps 210 (a set is shown as 210a-210d) may protrude from first surface 260, for example, with a triangular shape having tapered surfaces. Bumps 210 may include leading ramp surface 262, top ramp surface 264, and trailing ramp surface 266 that may protrude from first surface 260. Leading ramp surface 262 and trailing ramp surface 266 may taper in height with respect to first surface 260. Top ramp surface 264 may be parallel to or at any angle with respect to first surface 260. Bumps 210 may also include side surfaces 267 and 268 that may be substantially perpendicular or at any angle with respect to first surface 260.

On the opposing side, bumps 210 may each have underlying dimples 280 (a set is shown as 280a-280d) that are recessed into second surface 270. Dimple surfaces 272 and 276 may be at any angle with respect to the second surface 270. Each dimple 280 may include side surfaces 277 and 278, either of which may be substantially perpendicular or at any angle with respect to second surface 270. Dimple surfaces 272 and 276 and side surfaces 277 and 278 may be asymmetrical with respect to ramp surfaces 262, 264, and 266 and side surfaces 267 and 268 respectively. Alternatively, each dimple 280 may be symmetrical with respect to each bump 210. In the compressed configuration, any or all of dimples 280 may be above or below or substantially flattened with respect to second surface 270.

During installation, washer 200 may compress or substantially flatten from an initial configuration to a compressed configuration. As bolt 300 or nut 400 is tensioned, washer 200 is urged toward the compressed configuration. Each bump 210 may be forced toward first surface 260 thereby urging each underlying dimple 280 toward second surface 270.

Washer 200 may be configured for progressive compression of bump 210 with respect the fastener bearing surface. Leading ramp surface 262, top ramp surface 264, and trailing ramp surface 266 of bump 210 may be configured to progressively contact the fastener bearing surface. During installation, the fastener bearing surface may initially contact bump 210 at or near ramp trailing ramp surface 266, then at or near top ramp surface 264, and then at or near leading ramp surface 262. Thus, first surface 260 of bump 210 may experience a compression force or move toward a compressed configuration in approximately the following order: trailing ramp surface 266, top ramp surface 264, and leading ramp surface 262. Alternatively, the order may be reversed or re-ordered by altering the shape of bump 210. On the opposing side, each dimple 280a-280d may move toward the compressed configuration in substantially the same order each corresponding bump 210. In the compressed configuration, any or all of bumps 210 may be substantially flattened or slightly above or below first surface 260 and any or all of dimples 280 may be substantially flattened or slightly above or below second surface 270.

Considering the shape of bump 210, the contact width of bump 210 against the fastener bearing surface narrows as the compression force moves from trailing ramp surface 266 to top ramp surface 264 and then to leading ramp surface 262. This progressive compression may result in less increase in compression load, because the contact area of bump 210 against the fastener bearing surfaces decreases as the compression force is applied by the fastener bearing surface. Alternatively, bump 210 may be shaped to increase the contact width to increase the contact area as the compression force moves along trailing ramp surfaces 266, top ramp surface 264, and leading ramp 262. The shape of bump 210 may be configured for a desired compression loading.

Figure 7:
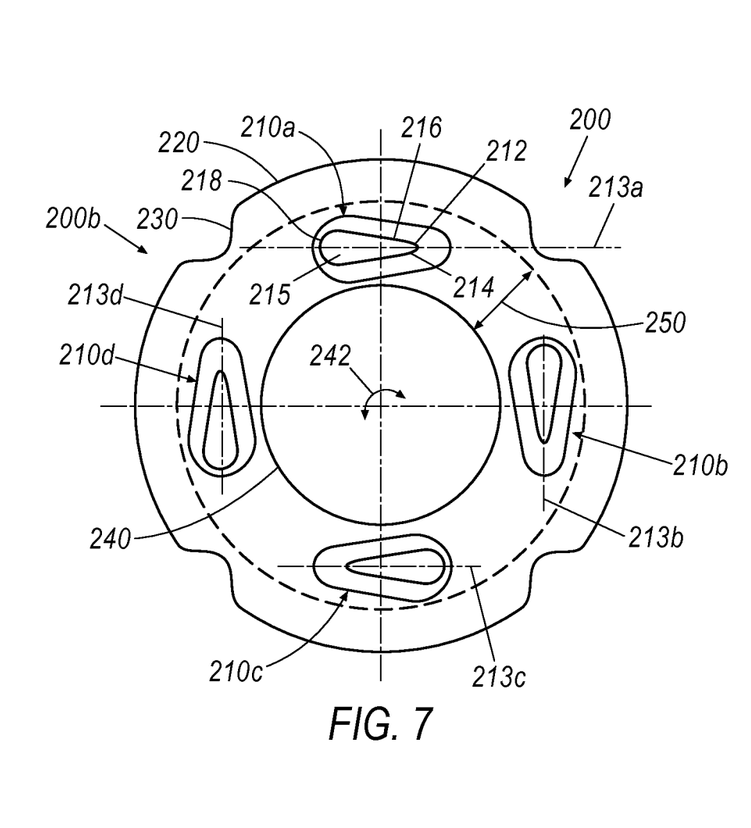
FIG. 7 illustrates an alternative embodiment of the indicating washer, more particularly, including bumps having triangular shapes with rounded ends and tapered side surfaces.
Figure 8:
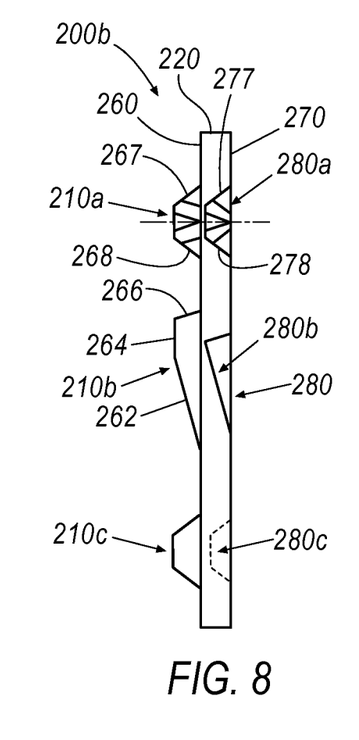
FIG. 8 illustrates a side view of the indicting washer of FIG. 7.

In another embodiment, FIG. 7 illustrates exemplary bumps 210 (a set is shown as 210a-210d) with rounded edges and angled surfaces. Bumps 210 may include rounded trailing end 218 that is rounded and connects straight side edges 214 and 216. Dimples 280 (a set is shown as 280a-280d) may have corresponding features. Washer 200 may also include side surfaces 262 and 266 that protrude at an angle with respect to first surface 260. See FIG. 8. Alternatively, leading end 212 may be rounded with trailing end 218 converging to a point or also being rounded.

Figure 9:
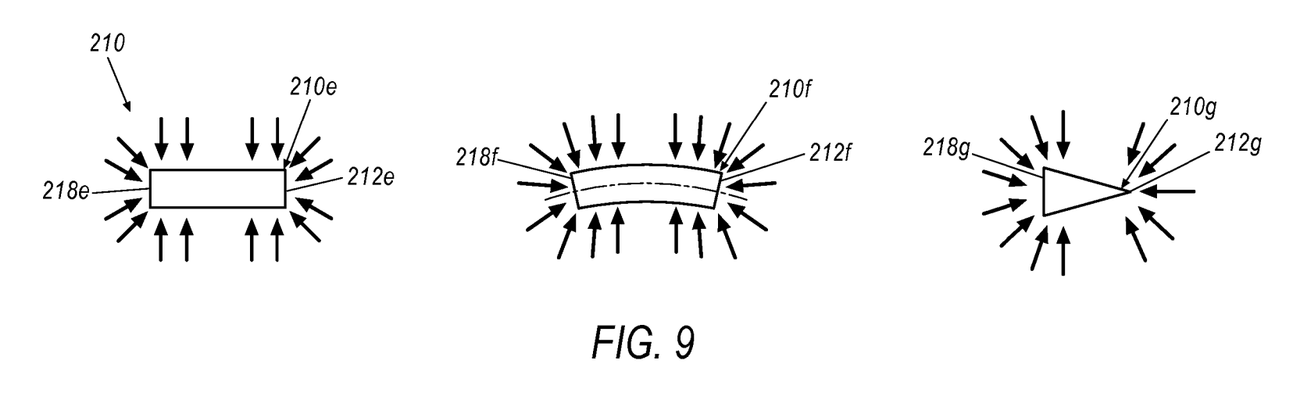
FIG. 9 illustrates top views of theoretical compression forces on exemplary bump embodiments, more particularly, having rectangular, semi-circular, and triangular shapes.

FIG. 9 illustrates a top view of theoretical compression forces on bump 210 during compression of washer 200. Bumps 210e-210g have different shapes, more particularly, bump 210e has a rectangular shape, bump 210f has a semi-circular shape, and bump 210g has a triangular shape as described above. Bumps 210e and 210f may each experience higher compression load at or near leading ends 212e and 212f and trailing ends 218e-218f with less compression load along at or near each middle portion. From a top view perspective, bumps 210e and 210f may each experience substantially symmetric compression loads about each middle portion. In contrast, bump 210g may experience higher compression load at or near trailing end 218g with progressively less compression load at or near leading end 212g. As a result of its shape that narrows in width, bump 210g may experience asymmetrical compression loads along its side surfaces. Thus, the shape of bump 210 may be configured to produce a desired distribution of compression loads along bump 210.

Figure 10:
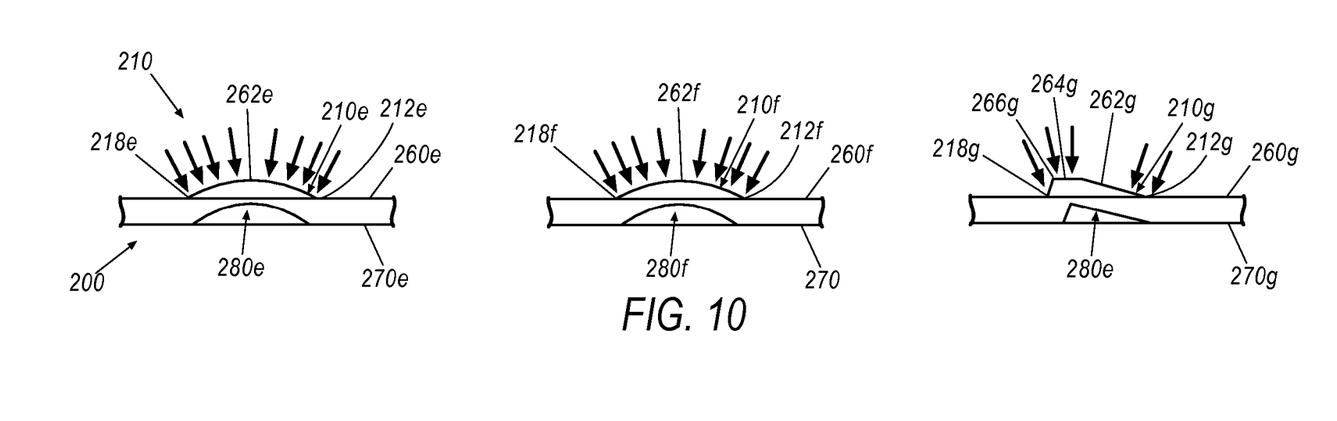
FIG. 10 illustrates a side view of theoretical compression forces on the bump embodiments of FIG. 9.

Referring to FIG. 10, side views of the theoretical compression forces on bump 210 are illustrated. Bumps 210e and 210f have a continuous ramp surface 262e and 262f with higher compression load at or near leading ends 212e-f and trailing ends 218e-f with less compression load along at or near the highest portion. From a side view perspective, bumps 210e and 210f may experience substantially symmetric compression loads about their middle portions. In contrast, bump 210g may experience a higher compression load at or near trailing ramp surface 266g, a medium compression load at or near top ramp surface 264g, and a lower compression load at or near leading ramp surface 262g. As a result of its side profile that asymmetrically tapers in height, bump 210g may experience asymmetrical compression loads along its ramp surfaces. Thus, the side profile of bump 210 may be configured to produce a desired distribution of compression loads along bump 210.

Figure 11:
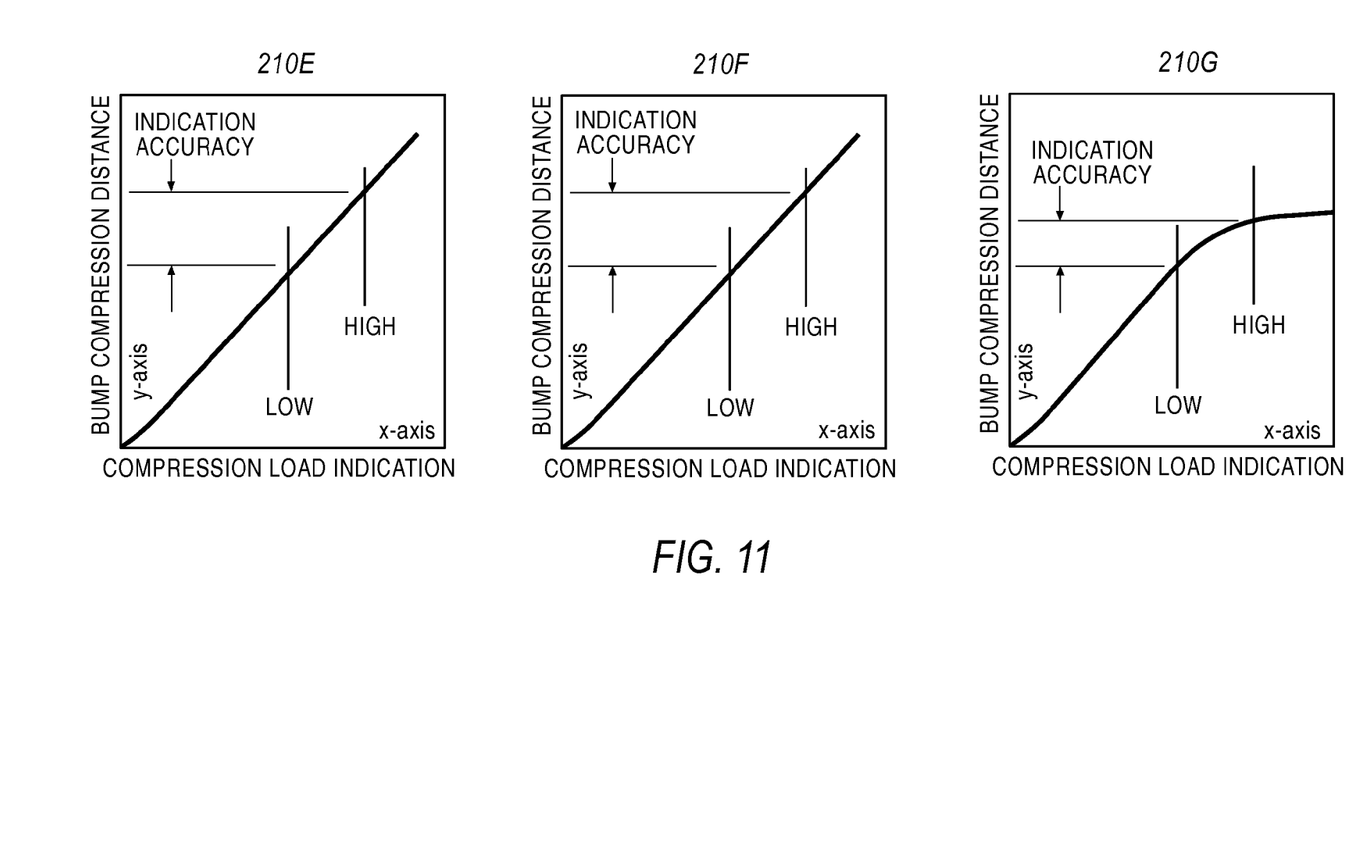
FIG. 11 illustrates a theoretical chart for the embodiments of FIG. 9, more specifically, a projection of bump compression distances for given compression loads.

A chart comparing theoretical compression distances resulting from given compression loads for bumps 210e-210g is illustrated in FIG. 11. This chart provides theoretical curves reflecting the accuracy of bumps 210e-g. Referring to the x-axis, the "compression load indication" is the amount of load experienced between each bump 210 of washer 200 and the corresponding contact area on the fastener bearing surface. The "low" and "high" indicate the range in which washer 200 should indicate a desired tension, for example, by deforming in a controlled manner. With reference to the y-axis, the "bump compression distance" is the distance that each bump 210 compresses under the compression load indication of the y-axis. The "indication accuracy" is the span of the curve in which washer 200 indicates an accurate tension. Therefore, the longer the curve for a given bump 210 maintains the "indication accuracy" between and beyond the low and high compression load indication ranges, the more accurate bump 210 will provide an indication of desired tension.

Comparing the curves for bumps 210e-210g, bump 210g maintains the indication accuracy range for a longer compression load range than bumps 210e and 210f Bumps 210e and 210f have a substantially constant rate of increase in compression distance during compression loading and toward peak compression, which pushes the curves for bumps 210e and 210f outside the indication accuracy range. In contrast, bump 210g has a decreased rate of increase in compression distance as peak compression is approached, which keeps the curve for bump 210g in the indication accuracy range longer than the curves for bumps 210e and 210f As such, bump 210g provides better indication accuracy than bumps 210e and 210f Accordingly, the shape of bump 210 may be configured for increased accuracy over a desired load compression range.

Bump 210 may have numerous features that optimize performance, cost, or compression accuracy. Bump axes 213a and 213c (FIG. 5) may be substantially perpendicular to washer radial axis 246 and bump axes 213b and 213d may be substantially perpendicular to washer radial axis 244, for example, to simplify tooling. Bumps 210 may be configured to the rotation direction of the fastener, for example, to provide a higher initial compression resistance and limit increases in friction as bumps 210 approach the compressed configuration. The tapered triangular shape of each bump 210 may be configured to limit compression distance, for example, to limit peak compression loads during over-rotation. Also, the tapered triangular shape of each bump 210 may provide a larger initial contact area that progressively reduces to a narrower contact area during compression, for example, to minimize frictional forces that lead to inaccurate rotation of washer 200.

Methods of operating an indicating washer system are also contemplated. The method may include providing an indicating washer having a first surface with a bump protruding therefrom, a second surface opposing the first surface, and an outer surface and bore defined between the first and second surfaces. The bump may include trailing, top, and leading ramp surfaces. The method may further include providing a fastener, urging the fastener toward the trailing ramp surface, advancing the fastener to compress the bump and contact the top ramp surface, and advancing the fastener to further compress the bump and contact the leading ramp surface.

Further embodiments may include methods of manufacturing an indicating washer. Methods may include positioning a metal sheet having first and second sides relative to a tool. The tool may have an inner cutting edge about a desired washer rotational axis, an outer cutting edge about the washer rotational axis, a punch positioned between the inner and outer cutting edges, and a stop opposing the punch. The punch may include a triangular shape or any other shape configured to form any of the bumps or dimples described herein. The inner cutting edge of the tool may be substantially circular and the outer cutting edge may have semi-circular segments interposed by recesses. Methods may further include passing the inner cutting edge substantially through the sheet to form a bore of the washer and passing the outer cutting edge substantially through the sheet to form an outer surface of the washer. Methods may also include urging the punch toward the sheet to form a dimple on the second side of the sheet thereby pushing a bump out of the first side of the sheet and stopping the bump with the stop to form a top surface on the bump. In addition, methods may include releasing the portion of the sheet forming a washer from the tool. The tool may have any number of additional protrusions, recesses, or surface textures to provide any desired features or performance characteristics to the washer. The tool may also have modular components, which allow for exchange between the various bump pattern disclosed herein or segmental reconditioning or replacement of any portion of the tool. Further embodiments may include any manufacturing technique, for example stamping, molding, machining, or any combination thereof.

Embodiments may be made using any suitable materials. Any embodiment herein may include steel, carbon steel, stainless steel, aluminum, aramids, bimetals, bronze, brass, ceramics, copper, fibers, iron, zinc, titanium, heat treated or hardened materials, plastic, rubber, shape memory materials, or any combination thereof.

The present disclosure is an asset for indicating washers that are designed to deform in a controlled manner under compression loads and are used to indicate when a desired tension has been achieved relative to the fastener. Embodiments of the present disclosure may prolong the useful life of the fastener and reduce unnecessary stress on the joint. Also, the present disclosure may allow for more accurate and stable tensioning of joints.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:

1. An indicating washer for fastening members together, the washer including:
   a first surface configured to engage a nut with a plurality of triangular bumps protruding therefrom, each of the bumps having a substantially flat top surface with a triangular shape offset from and substantially parallel to the first surface, each bump being radially positioned about a washer rotational axis and having a width that tapers along a bump axis perpendicular to the washer rotational axis; and
   a second surface opposing the first surface, the second surface having a dimple that substantially underlies each bump.

2. The system of claim 1, wherein at least one triangular bump has first and second side surfaces defining the top surface having the width that decreases along its length, perpendicular to the washer rotational axis, from a trailing end to a leading end.

3. The system of claim 1, wherein the top surface tapers, symmetrically along the bump axis, from a trailing end and a leading end.

4. The system of claim 1, wherein at least one triangular bump is asymmetrical with respect to a washer radial axis that extends from the washer rotational axis.

5. The system of claim 1, wherein the top surface is defined by a straight trailing edge at a trailing end and two straight side edges converging, along the bump axis, to a leading end.

6. The system of claim 1, wherein the bump axis is substantially perpendicular to a washer radial axis extending from the washer rotational axis.

7. The system of claim 1, wherein each bump has at least one more ramp surface than the respective underlying dimple.

8. An indicating washer system for fastening members together, the system including:
   a nut having a first surface, a second surface opposing the first surface, an outer surface with a hexagon perimeter, and a bore with threads, the outer surface and bore being defined between the first and second surfaces of the nut; and
   a washer having a first surface configured to engage the nut with a plurality of triangular bumps protruding therefrom, each of the bumps having a substantially flat top surface with a triangular shape offset from and substantially parallel to the first surface, each bump being radially positioned about a washer rotational axis and having a width that tapers along a bump axis perpendicular to the washer rotational axis, and a second surface opposing the first surface, the second surface having a dimple that substantially underlies each triangular bump.

9. The system of claim 8, wherein at least one triangular bump has first and second side surfaces defining the top surface having the width that decreases along its length, perpendicular to the washer rotational axis, from a trailing end to a leading end.

10. The system of claim 8, wherein the top surface tapers, symmetrically along the bump axis, between a trailing end and a leading end.

11. The system of claim 8, wherein at least one triangular bump is asymmetrical with respect to a washer radial axis that extends from the washer rotational axis.

12. The system of claim 8, wherein the top surface is defined by a straight trailing edge at a trailing end and two straight side edges converging, along the bump axis, to a leading end.

13. The system of claim 8, wherein the bump axis is substantially perpendicular to a washer radial axis extending from the washer rotational axis.

14. The system of claim 8, wherein each bump has at least one more ramp surface than the respective underlying dimple.

15. The system of claim 8, wherein the second surface of the nut is configured to constrain movement of the washer in the axial direction while allowing rotation and compression of the washer.

16. An indicating washer comprising:
a first surface configured to engage a nut with a plurality of triangular bumps protruding therefrom, each of the bumps having a substantially flat top surface with a triangular shape offset from and substantially parallel to the first surface, each bump being radially positioned about a washer rotational axis and having a width that tapers symmetrically along a bump axis perpendicular to the washer rotational axis; and a second surface opposing the first surface, the second surface having a dimple that substantially underlies each bump.

17. The washer of claim 16, wherein at least one triangular bump has first and second side surfaces defining the top surface having the width that decreases along its length, perpendicular to the washer rotational axis, from a trailing end to a leading end.

18. The washer of claim 16, wherein the top surface tapers, along the bump axis, between a trailing end and a leading end.

19. The washer of claim 16, wherein at least one triangular bump is asymmetrical with respect to a washer radial axis that extends from the washer rotational axis.

20. The washer of claim 16, wherein the top surface is defined by a straight trailing edge at a trailing end and two straight side edges converging, along the bump axis, to a leading end.

* * * * *